US011310067B1

(12) United States Patent
Panthi et al.

(10) Patent No.: US 11,310,067 B1
(45) Date of Patent: Apr. 19, 2022

(54) ADAPTIVE POWER FLUX DENSITY CONTROL FOR AERONAUTICAL BROADBAND SYSTEM REDUCING INTERFERENCE TO TERRESTRIAL COMMUNICATION SYSTEMS

(71) Applicant: Thales Avionics, Inc., Irvine, CA (US)

(72) Inventors: Sunil Panthi, Melbourne, FL (US); Arnaud Tonnerre, Rockledge, FL (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 17/159,713

(22) Filed: Jan. 27, 2021

(51) Int. Cl.
*H04L 12/28* (2006.01)
*H01Q 1/28* (2006.01)
*H04B 7/185* (2006.01)

(52) U.S. Cl.
CPC .......... *H04L 12/2801* (2013.01); *H01Q 1/28* (2013.01); *H04B 7/1851* (2013.01)

(58) Field of Classification Search
CPC ..... H04L 12/2801; H01Q 1/28; H04B 7/1851
See application file for complete search history.

(56) References Cited

U.S. PATENT DOCUMENTS

| 10,320,471 | B1* | 6/2019 | Panthi | H04B 7/18543 |
|---|---|---|---|---|
| 10,644,385 | B1* | 5/2020 | Greenwood | B64C 27/08 |
| 2012/0119952 | A1* | 5/2012 | Pozgay | G01S 7/2813 |
| | | | | 342/372 |
| 2019/0207676 | A1* | 7/2019 | Noerpel | H04B 7/18563 |

* cited by examiner

*Primary Examiner* — Harry H Kim
(74) *Attorney, Agent, or Firm* — Sage Patent Group

(57) ABSTRACT

A broadband communication system aboard an aircraft includes a steerable antenna, a modem, and processing circuitry. The processing circuitry determines a region on the ground where sidelobes of the radiated signal power pattern are incident. A regulatory power flux density (PFD) envelope is determined. PFD generated by the sidelobes in the region on the ground is estimated based on the ESD pattern of the steerable antenna and the aircraft altitude, attitude, and location. The processing circuitry determines, based on the estimate of the PFD generated by the sidelobes in the region on the ground and based on the regulatory PFD envelope, a target ESD pattern for the steerable antenna. The processing circuitry further controls at least one of: 1) output power of the modem based on the target ESD pattern; and 2) bandwidth of the data traffic output by the modem based on the target ESD pattern.

21 Claims, 14 Drawing Sheets

ADAPTIVE POWER FLUX DENSITY CONTROL FOR AERONAUTICAL BROADBAND SYSTEM REDUCING INTERFERENCE TO TERRESTRIAL COMMUNICATION SYSTEMS

FIELD

The present disclosure relates to aeronautical broadband communication systems such as Aeronautical Earth Station in Motion (A-ESIM) which communicate with fixed satellite service.

BACKGROUND

In the aviation domain, commercial and business aviation provide broadband communications, e.g., for passenger Internet connectivity, using Fixed Satellite Service (FSS) in the Ka-band frequency band, 27.5-30 GHz. The International Telecommunication Union (ITU) in World Radiocommunication Conference 2019 (WRC-19) adopted a new resolution to share the Ka-band frequency (27.5 GHz to 29.5 GHz) with Aeronautical Earth Station in Motion (A-ESIM) terminals which include aircraft and terrestrial applications, generally for 5G standard communications. The resolution from WRC-19 is expected to be adopted globally by member states in the near future. An A-ESIM terminal must comply with a regulatory power flux density (PFD) envelope to protect the terrestrial services operating in the shared frequency band. The term "A-ESIM" is also referred to herein as "ESIM" which is an example embodiment of a "broadband communication system" for an aircraft.

Aeronautical broadband communication because of its dynamic and global nature adds to the additional complexity in complying with the PFD requirement defined by ITU. Sufficient technology to dynamically and adaptively control the PFD of A-ESIM terminal is not available today. Service by an A-ESIM terminal should be disabled, e.g., by disabling transmission from the aircraft, if any of a regulatory PFD envelope for a region on the ground is exceeded. Although it serves the primary goal of complying with the regulatory PFD envelope to avoid excessive interference to terrestrial communication systems, this approach of disabling transmissions creates penalties in the form of reduced data rate, lower spectral efficiency, poor broadband connectivity availability, and increased cost of connectivity service.

SUMMARY

Some embodiments are directed to a broadband communication system aboard an aircraft that includes a steerable antenna, a modem, and processing circuitry. The steerable antenna produces an effective isotropic radiated power (EIRP) spectral density (ESD) pattern with a main lobe having a primary axis that is steerable toward a target satellite and a sequence of side lobes that are increasingly angularly offset away from the primary axis. The modem is configured to output data traffic for transmission through the steerable antenna. The processing circuitry is configured to obtain obtain aircraft altitude, attitude, and location, and to determine target satellite coordinates indicating direction from the aircraft to the target satellite, based on the aircraft altitude, attitude, and location. The processing circuitry controls the steerable antenna to steer the primary axis of the main lobe of the ESD pattern toward the target satellite based on the target satellite coordinates. The processing circuitry determines a region on the ground where the sidelobes are incident, based on the radiated signal power pattern of the steerable antenna and the aircraft altitude, attitude, and location. The processing circuitry determines a regulatory power flux density (PFD) envelope based on the region on the ground. The processing circuitry estimates PFD generated by the sidelobes in the region on the ground based on the ESD pattern of the steerable antenna and the aircraft altitude, attitude, and location. The processing circuitry determines, based on the estimate of the PFD generated by the sidelobes in the region on the ground and based on the regulatory PFD envelope, a target ESD pattern for the steerable antenna. The processing circuitry controls at least one of: 1) output power of the modem based on the target ESD pattern; and 2) bandwidth of the data traffic output by the modem based on the target ESD pattern.

Some other related embodiments are directed to a broadband communication system for an aircraft. The aircraft includes a steerable antenna configured to produce an ESD pattern with a main lobe having a primary axis that is steerable toward a target satellite and a sequence of side lobes increasingly angularly offset from the primary axis. The aircraft further includes a modem configured to output data traffic for transmission through the steerable antenna. The broadband communication system includes processing circuitry configured to be coupled to the high power amplifier, the processing circuitry is configured to operate to obtain aircraft altitude, attitude, and location, and to determine a region on the ground where the sidelobes are incident based on the radiated signal power pattern of the steerable antenna and the aircraft altitude, attitude, and location. The processing circuitry is further configured to determine a regulatory PFD envelope based on the region on the ground, and to estimate PFD generated by the sidelobes in the region on the ground based on the ESD pattern of the steerable antenna and the aircraft altitude, attitude, and location. The processing circuitry is further configured to determine, based on the estimate of the PFD generated by the sidelobes in the region on the ground and based on the regulatory PFD envelope, a target ESD pattern for the steerable antenna. The processing circuitry is further configured to control at least one of: 1) output power of the modem based on the target ESD pattern; and 2) bandwidth of the data traffic output by the modem based on the target ESD pattern.

Some other related embodiments are directed to a computer program product that includes a non-transitory computer readable medium storing program instructions that is executable by at least one processor of a processing circuit of a broadband communication system aboard an aircraft. The aircraft includes a steerable antenna configured to produce an ESD pattern with a main lobe having a primary axis that is steerable toward a target satellite and a sequence of side lobes increasingly angularly offset from the primary axis. The aircraft further includes a modem configured to output data traffic for transmission through the steerable antenna. The program instructions executed by the at least one processor causes the at least one processor to perform operations that obtain aircraft altitude, attitude, and location. The operations determine a region on the ground where the sidelobes are incident based on the radiated signal power pattern of the steerable antenna and the aircraft altitude, attitude, and location. The operations determine a regulatory PFD envelope based on the region on the ground. The operations estimate PFD generated by the sidelobes in the region on the ground based on the ESD pattern of the steerable antenna and the aircraft altitude, attitude, and location. The operations determine, based on the estimate of the PFD generated by the sidelobes in the region on the ground and based on the regulatory PFD envelope, a target ESD pattern for the steerable antenna. The operations control at least one of: 1) output power of the modem based on the target ESD pattern; and 2) bandwidth of the data traffic output by the modem based on the target ESD pattern Other broadband communication systems, computer program products, and related methods according to embodiments of the inventive subject matter will be or become apparent to one with skill in the art upon review of the following drawings and detailed description. It is intended that all such additional broadband communication systems, computer program products, and related methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments of the present disclosure are directed to controlling the PFD that generated by the sidelobes of effective isotropic radiated power (EIRP) spectral density (ESD) pattern from a steerable antenna in a region on the ground. More particularly, the generated PFD can be controlled to be satisfy a regulatory PFD envelope that has been adopted, e.g., by a country or regulatory entity, for the region on the ground.

As will be described in further detail below, in some embodiments to protect the 5G and other terrestrial service from interference from A-ESIM, a regulatory PFD profile (a maximum PFD that is permitted under regulations to be produced at the surface of the Earth) is used. ESIMs terminals (also referred to as "ESIMs" for brevity) and other broadband communication systems are configured to identify what PFD profile(s) apply, if any, based on where the PFD generated by the sidelobes is incident to the ground. A regulatory PFD profile may be determined to regulatorily constrain operation of an ESIM when the ESIM is operating co-frequency with terrestrial stations operating in the band defined by that regulatory administration or when within line of sight of a neighboring administration.

Figure 1:
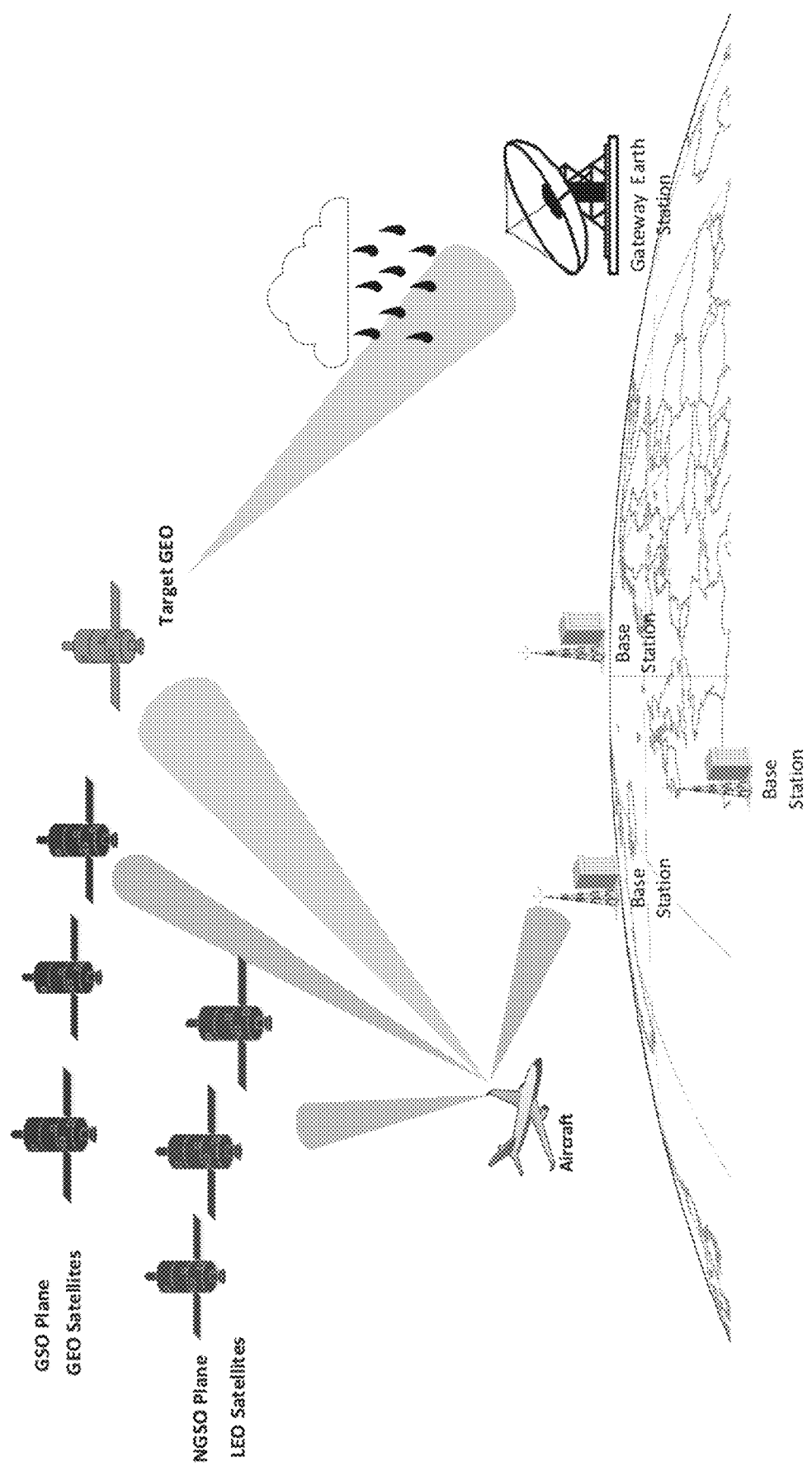
FIG. 1 illustrates potential interference from an A-ESIM terminal towards terrestrial and space communication targets according to some embodiments of the present disclosure.

FIG. 1 illustrates potential interference from an A-ESIM terminal towards terrestrial and space communication targets. Referring to the example of FIG. 1, communications between an A-ESIM terminal onboard the aircraft and a gateway Earth station are relayed through a target geosynchronous (GEO) satellite, medium Earth orbit (MEO) satellite, low Earth orbit (LEO), or other satellite service which may communicate using, for example, Ka, Ku or other frequency band. The A-ESIM terminal can be coupled to communicate through a steerable antenna that is configured to produce an effective isotropic radiated power (EIRP) spectral density (ESD) pattern with a main lobe having a primary axis that is steerable toward a target satellite and a sequence of side lobes increasingly angularly offset from the primary axis. As shown in FIG. 1, the sidelobes can be incident to ground base stations, such as 5G cellular radio base stations, where they could interfere with terrestrial communications between the ground base stations and user terminals, such as cellular phones. The PFD generated by the sidelobes at one of the A-ESIM generally depends on the radiated ESD pattern of the steerable antenna, but attenuated by the aircraft body and atmospheric conditions, free space loss and depending on the aircraft altitude, attitude, and location.

Figure 2:
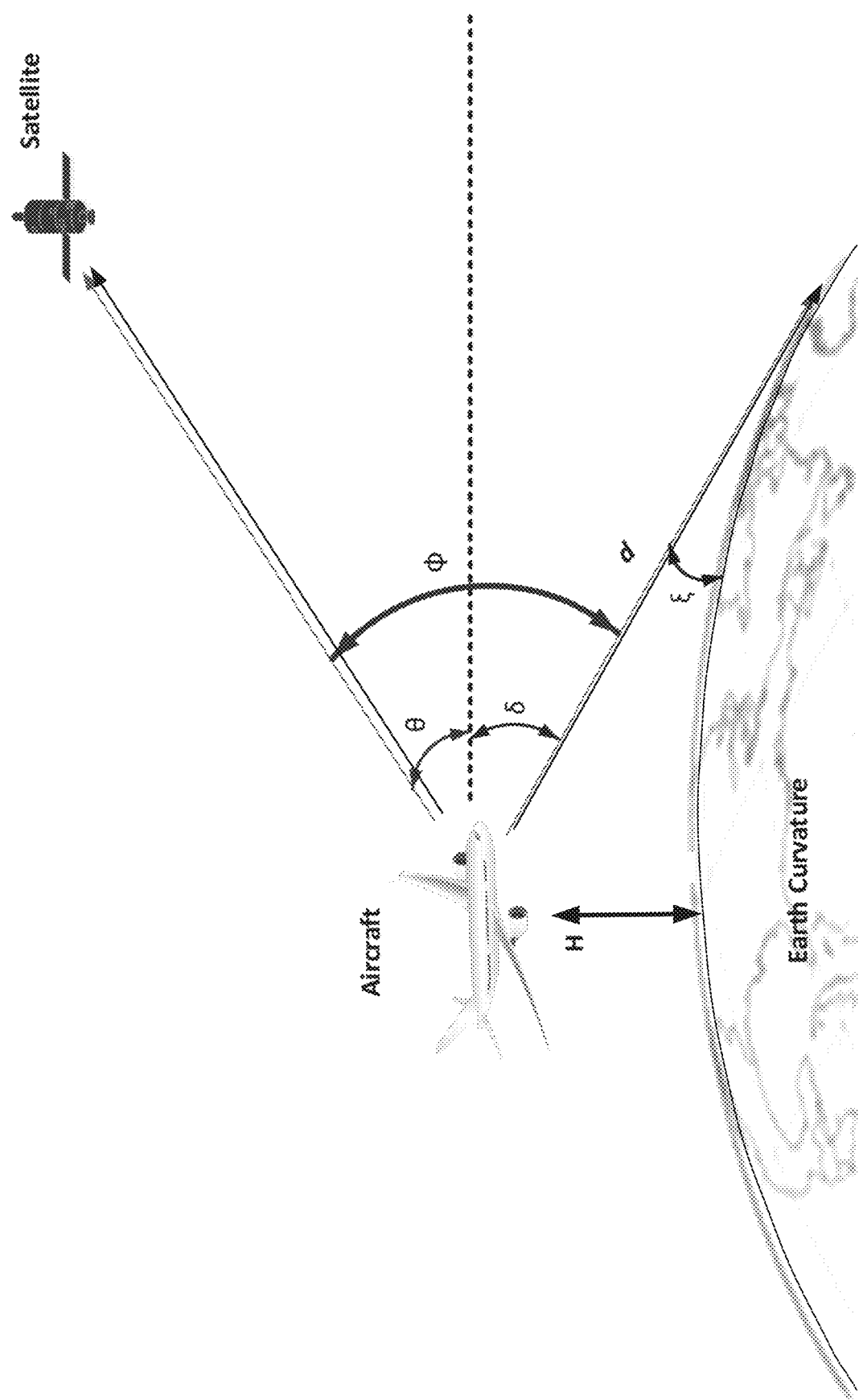
FIG. 2 depicts the A-ESIM terminal transmitting towards a GEO satellite while sidelobes impact a regions of the Earth.

ESD can be determined from EIRP based on the formula: ESD=EIRP−10*log 10(Bandwidth), in accordance with some embodiments. EIRP can be determined based on the formula: EIRP=Antenna Gain+Amplifier Output Power−Feed Loss−Radome Loss (if applicable), in accordance with some embodiments. It is noted that PFD is referenced at the receiver end, and ESD is referenced at the transmit end. The term "PFD envelope" can refer to one or more of the PFD envelops provided by ITU as an upper limit which aeronautical broadband systems are not allowed to exceed, in accordance with some embodiments. The term "PFD level" can refer to a PFD level that is estimated by a mathematical formula in a given time instant, in accordance with some embodiments. FIG. 2 depicts the A-ESIM terminal transmitting towards a geostationary (GEO) satellite. A directional broadband antenna onboard the aircraft transmits towards the geosynchronous orbit (GSO) and will have side-lobes transmitted towards the Earth's surface. In this illustrated geometry, there are four (4) angles created. Elevation angle (θ) is the angle above the horizon looking towards satellite from the aircraft. Angle below Horizon (δ) is the angle below horizon looking towards earth's surface from the aircraft. Angle of Arrival (ξ) is the angle above the earth's horizon looking towards aircraft from the ground, and is used to determine a regulatory PFD profile as explained in further detail below. Off-axis Angle (Φ) is the angle created from line of sight between aircraft and satellite to the terrestrial service or earth surface. The angle of arrival and angle below horizon are not the same due to the curvature of the earth.

There are two descriptions of separation between the aircraft and the Earth's surface: altitude (H) which is the shortest distance from aircraft to the Earth's surface; and distance (d) which is any distance other than altitude between aircraft and the Earth's surface. Distance is the same as altitude directly below the cruising aircraft.

Figure 10:
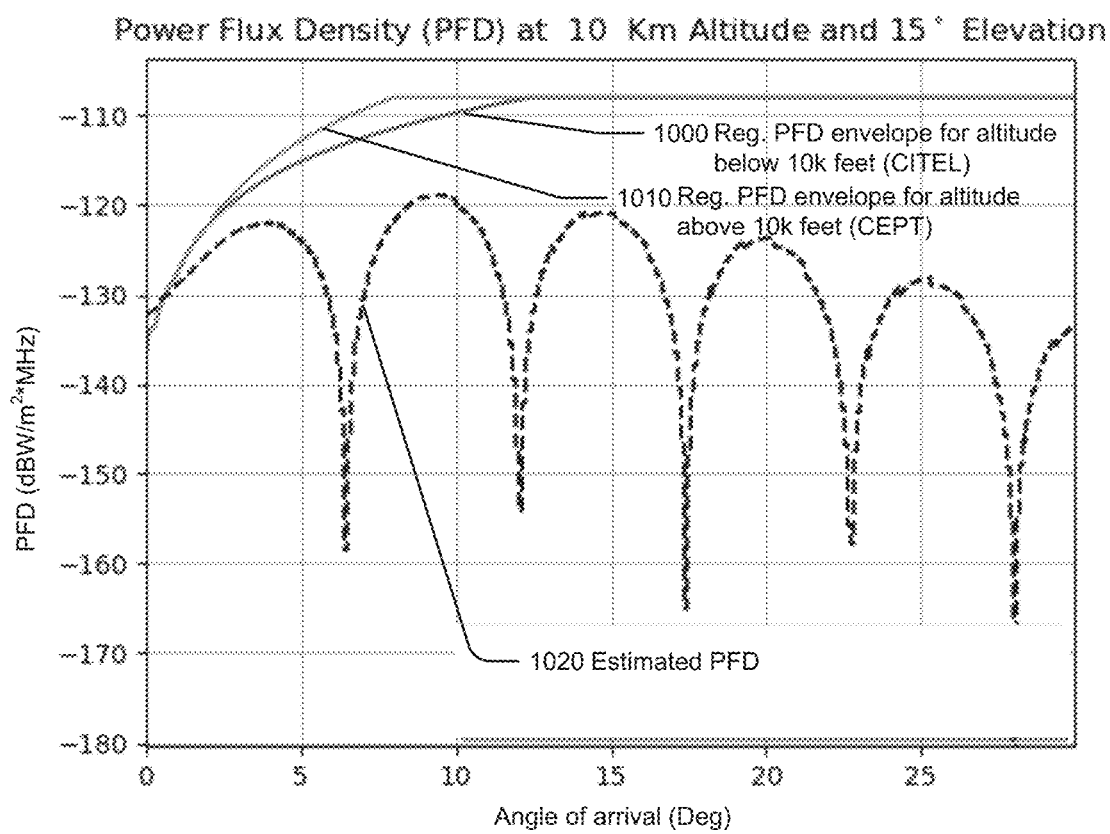
FIGS. 10-12 illustrate graphs of three scenarios of how the estimated PFD generate by the sidelobes compares to the regulatory PFD envelopes for the incident region and the associated responsive actions to control modem output power and/or data bandwidth in accordance with some embodiments.
Figure 11:
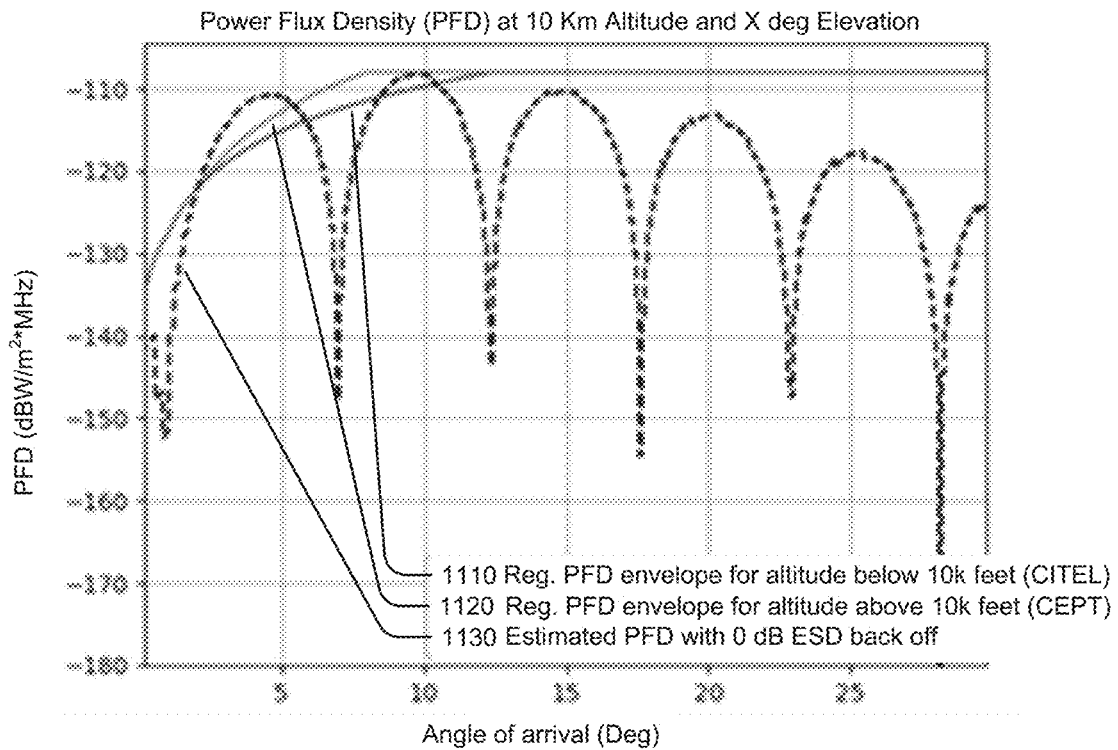
Figure 12:
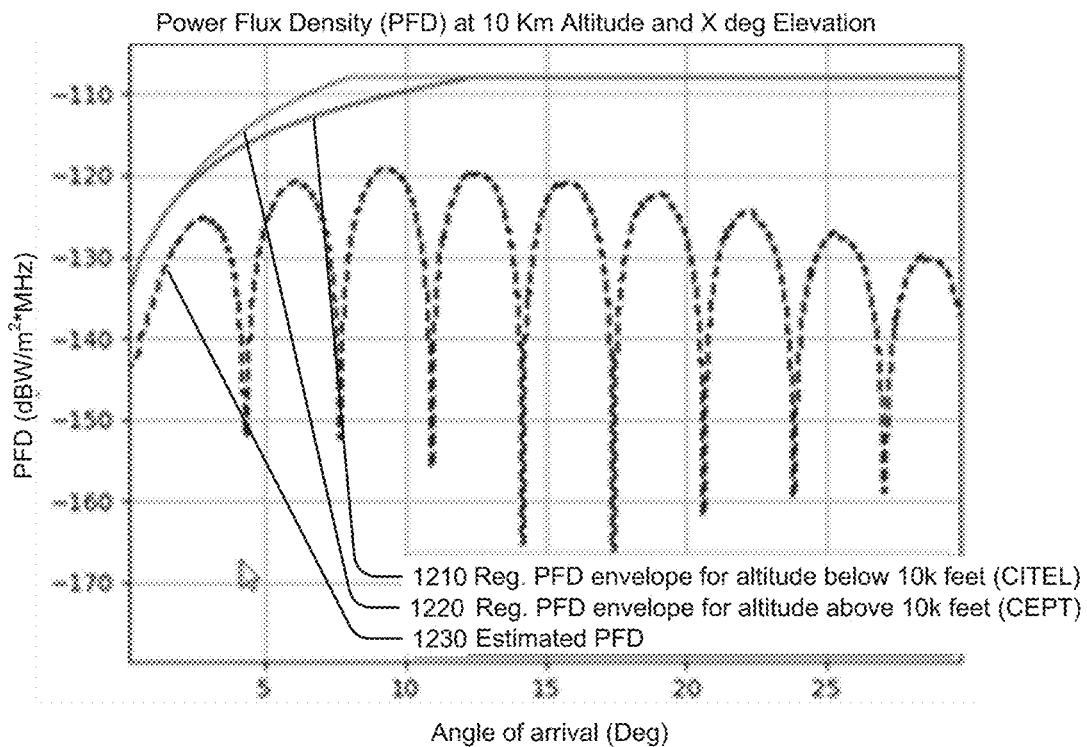

In some illustrative embodiments, the defined regulatory PFD envelope operating in 27.5 GHz to 29.5 GHz using GEO Fixed Satellite Service (FSS) is defined by two different envelopes as shown in FIGS. 10-12. In FIG. 10, a regulatory PDF envelope 1010 is defined for aircraft above 10,000 feet altitude pursuant to the European Conference of Postal and Telecommunications Administrations (CEPT). Another revelatory PDF envelope 1000 is defined for aircraft below 10,000 feet altitude pursuant to the Inter-American Telecommunication Commission (CITEL). By way of another example in FIG. 11, a regulatory PDF envelope 1120 is defined for aircraft above 10,000 feet altitude pursuant to CEPT, and another inventory PDF envelope 1110 is defined for aircraft below 10,000 feet altitude pursuant to CITEL. Still another example is illustrated in FIG. 12 by a regulatory PDF envelope 1220 is defined for aircraft above 10,000 feet altitude pursuant to CEPT, and another inventory PDF envelope 1210 is defined for aircraft below 10,000 feet altitude pursuant to CITEL. Although it is contemplated that the regulatory PDF envelopes may vary between examples of FIGS. 10-12, the regulatory PDF envelopes for aircraft above 10,000 feet in each of FIGS. 10-12 may be the same and the repertory PDF envelopes for aircraft below 10,000 feet in each of FIGS. 10-12 may be the same.

The primary goal of the regulatory PFD envelope is to protect the terrestrial communication services, e.g., 5G radio base station, from radio signals transmitted by an A-ESIM terminal operating in the same frequency band. When more than one regulatory PFD envelope has been defined to regulate PFD in a geographic region on the ground, the altitude of the aircraft may be used to select which of the different regulatory PFD envelopes is to be used to control in the region the PFD generated by the sidelobes transmitted by the aircraft antenna.

In order to protect the adjacent satellites along the GSO arc and NGSO from interference, a regulatory ESD envelope can be adopted. Such envelopes are easier to comply with by larger and symmetrical antennas such as a 90 cm circular antenna. However, an A-ESIM terminal using an antenna having smaller effective diameter, which is non-circular in shape, varies in geometry towards the satellite creates a challenge to comply with ESD limits (envelopes). To comply with such limits, an A-ESIM terminal lowers the ESD by either lowering the EIRP and/or decreasing the bandwidth. As a result, A-ESIM terminals may implement spread spectrum technology in the return channel. The Federal Communication Commission (FCC) in the USA requires A-ESIM (also referred by Earth Stations Aboard Aircraft (ESAA)) to comply with two envelopes—the plane perpendicular and plane tangent to the GSO orbit as defined in 25.218 and shown in FIG. 3.

Figure 3:
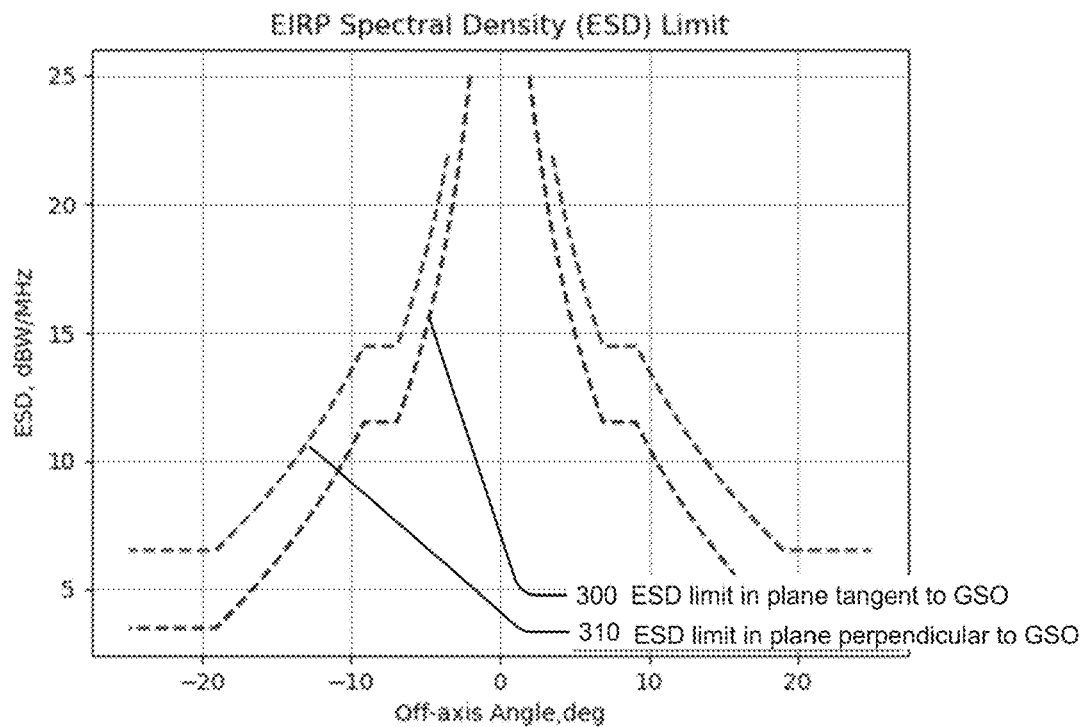
FIG. 3 illustrates the ESD limit (envelope) corresponding to the plane tangential to the GSO and the other ESD limit (envelope) corresponding to the plane perpendicular to the GSO.

Referring to FIG. 3, the ESD limit (envelope) 300 corresponds to the plane tangential to the GSO and the other ESD limit (envelope) 310 corresponds to the plane perpendicular to the GSO. The illustrated ESD envelope can correspond to a FCC regulation. The ESD limits (envelopes) show the variation of ESD permitted as a function of off-axis angle.

Generally, an antenna creating an elliptical beam shall lower the operating ESD to comply with the ESD limit (envelope) in certain geometry—generally higher skew and lower elevation angle (for certain antenna types). Hence, the allowed ESD varies based on the location of the A-ESIM terminal and the target satellite. Although PFD and ESD envelopes seek to ensure the protection of the terrestrial services and adjacent satellites respectively, two envelopes have a large influence on the operating condition and efficiency. When studying the impact of PFD restriction, ESD restriction must be accounted for to improve communication throughput and operating efficiency. In the GSO plane, the highest skew angle—90° tends to have the most restrictive ESD. Whereas an A-ESIM terminal at the lowest skew—0°, tends to have the most relaxed ESD. Such ESD restriction comes into consideration while evaluating the operating PFD and the envelope.

Figure 4:
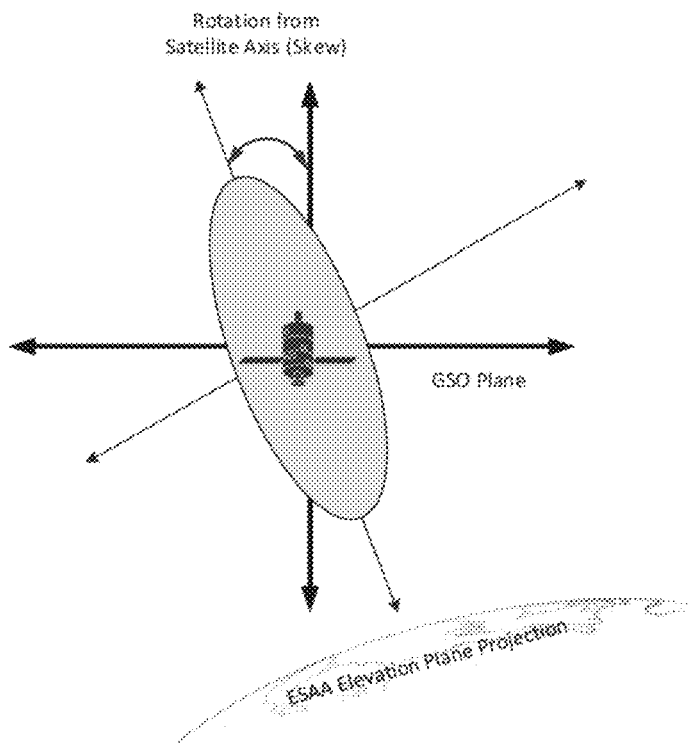
FIG. 4 illustrates an elliptical A-ESIM antenna beam with an elevation plane projecting towards terrestrial service and skewed from the GSO arc according to some embodiments of the present disclosure.

PFD and ESD are interrelated variables. Operating ESD is determined by the ESD envelope. Hence, it can be important to determine the operating ESD before computing PFD in the given location. The ESD envelope is determined by axis-reference to the GSO plane—skew angle. When the elevation plane is skewed by 90°, allowed ESD is most restricted. Conversely, when the elevation plane of the beam is not skewed or at the lowest skew angle allowed ESD is the most relaxed. FIG. 4 illustrates an elliptical A-ESIM terminal antenna beam with an elevation plane projecting towards terrestrial service and skewed from the GSO arc. As a result, the location of A-ESIM in relation to the target satellite dictates allowed ESD.

In accordance with some embodiments, an available EIRP is constrained by the ESD envelope to be no greater than an allowed ESD. The allowed ESD is then constrained by the regulatory PFD envelope(s) to be no greater than an operating ESD for an aircraft location.

Realistically the worst of two ESD envelopes, which is one for the tangent to GSO and second for perpendicular to the GSO, is the proper evaluation technique. However, ESD limits for elliptical beam such as at 10-degree elevation angle makes it challenging to both comply with ESD limits and provide an efficient broadband communications link. In accordance with some embodiments, it is assumed that a waiver is obtained to comply with the ESD envelope for the plane perpendicular to the GSO. The waiver allows the A-ESIM terminal to comply with the ESD limit for plane along GSO arc. Hence, the ESD limits only to the tangent to the GSO may be applied for those embodiments.

Figure 5:
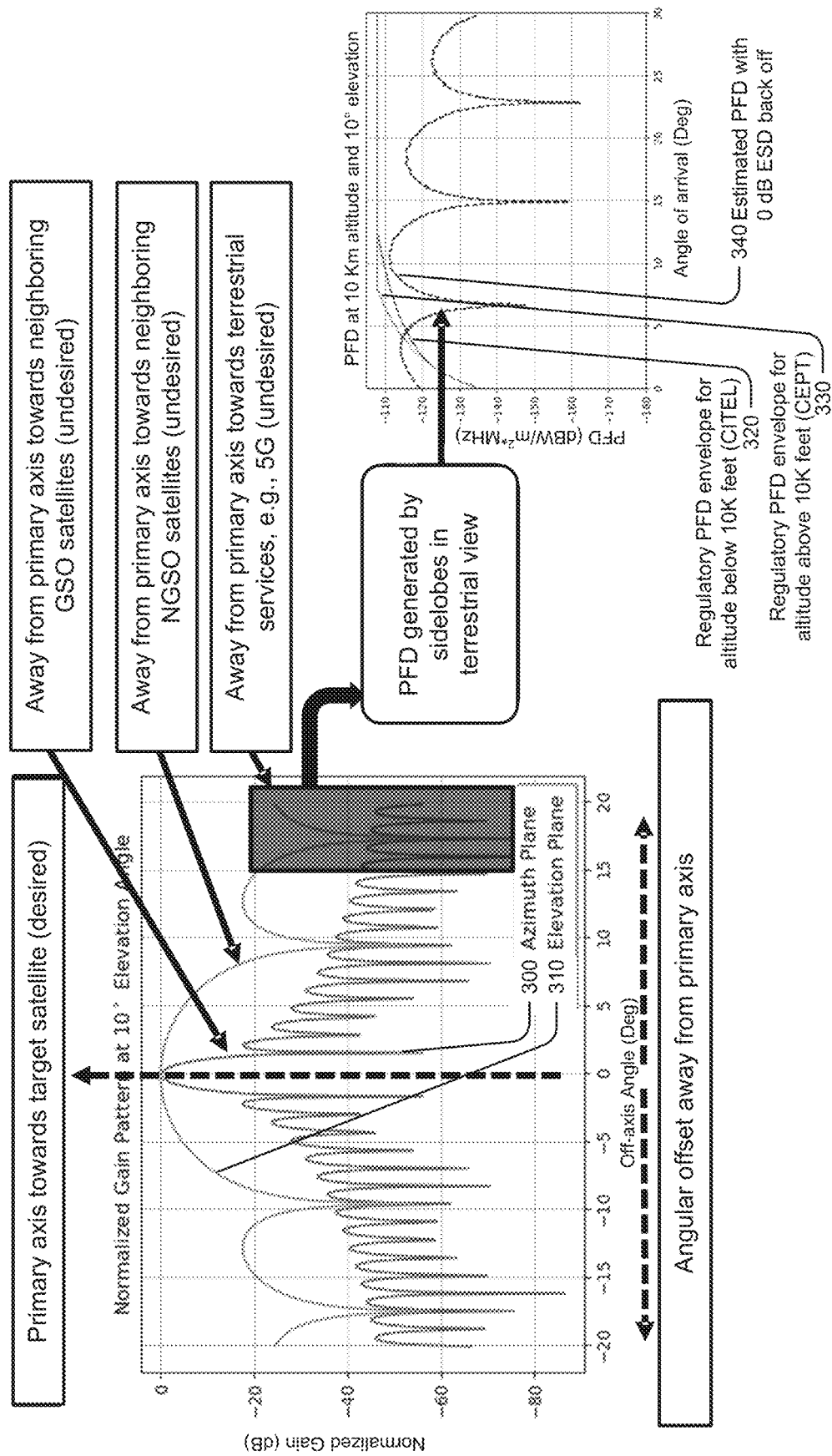
FIG. 5 illustrates the pattern transmitted by a steerable antenna at low elevation angle.

FIG. 5 illustrates the normalized gain pattern produced (transmitted) by a steerable antenna which is converted into ESD pattern. The ESD pattern has a main lobe with a primary axis that is steerable toward a target satellite and a sequence of side lobes that are increasingly angularly offset away from the primary axis. The sidelobes generate a PFD in a region on the ground based on the ESD pattern of the steerable antenna and the aircraft altitude, attitude, and location. FIG. 5 further illustrates an example regulatory PFD envelope 330 for aircraft altitude above 10,000 feet and another regulatory PFD envelope 324 aircraft altitude below 10,000 feet. The PFD generated by the sidelobes in a region on the ground is illustrated by profile 340.

Figure 14:
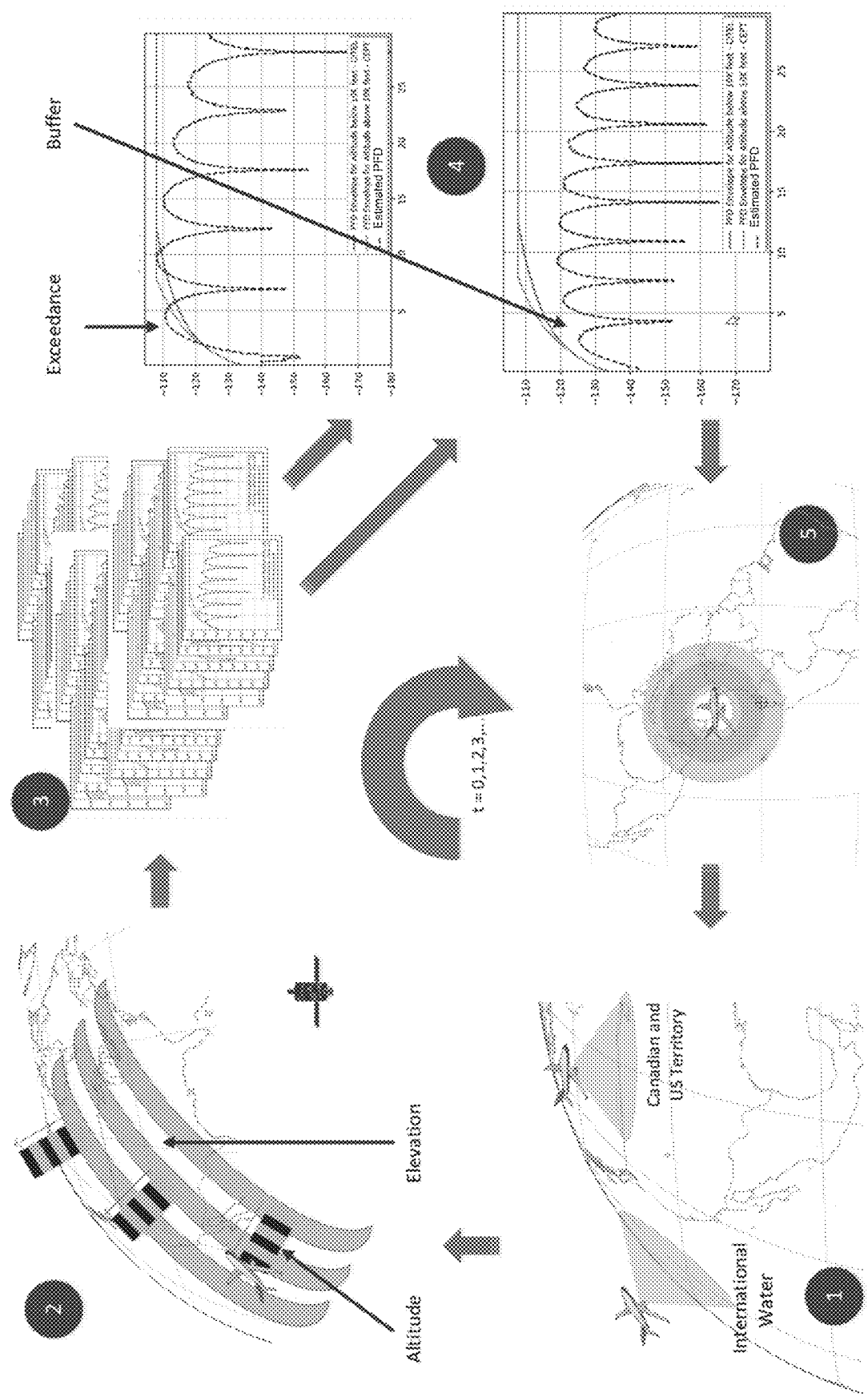
FIG. 14 illustrates an example ordered sequence of the operations explained above regarding FIGS. 6, 7, 8, 9, 11, 12, 13, and 14 to control the output power of the modem and/or the bandwidth of data traffic output by the modem in accordance with some embodiments.
Figure 15:
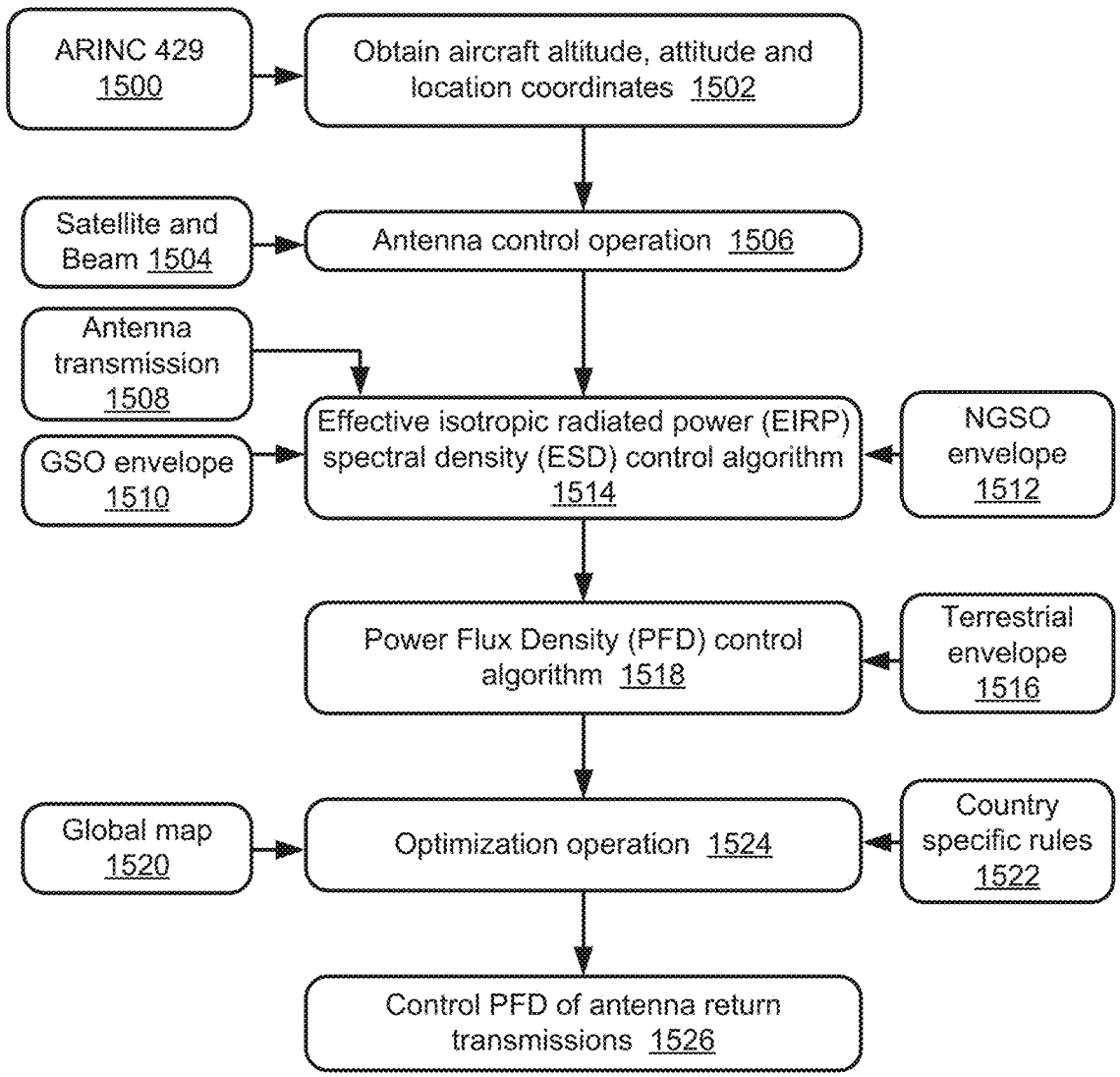
FIG. 15 illustrates another view of operations that may be performed by the processing circuit in FIG. 16 in accordance with some embodiments.
Figure 16:
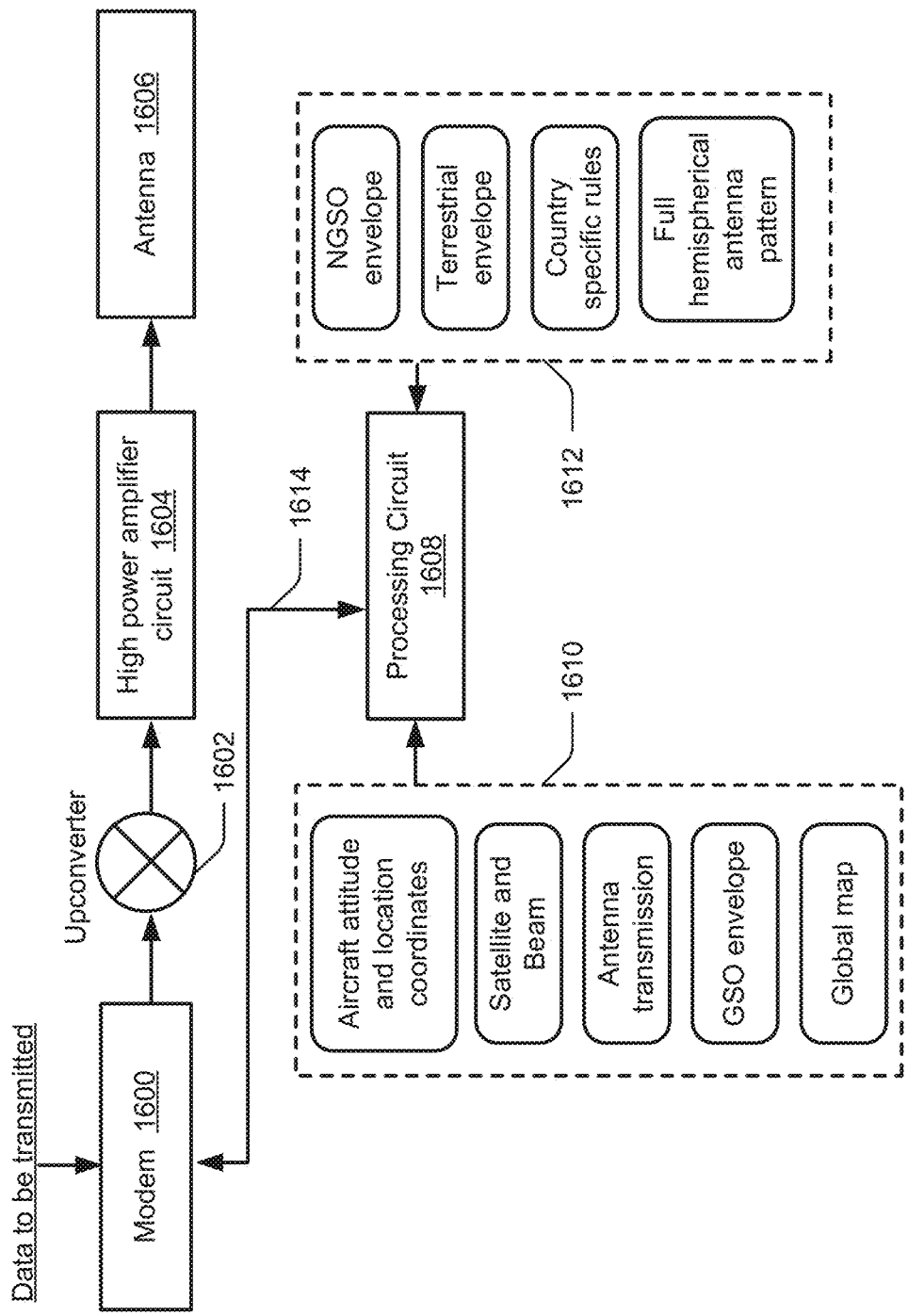
FIG. 16 is a block diagram of components of a broadband communication system in accordance with some embodiments.

Various embodiments of a broadband communication system, such as an A-ESIM terminal, are now described in the context of FIGS. 6-16. FIG. 16 is a block diagram of components of a broadband communication system in accordance with some embodiments. A broadband communication system as referenced herein does not necessarily include all illustrated components, such as RF front end of the upconverter 1602, the high power amplifier circuit 1604, and the antenna 1606. The broadband communication system can include a processing circuit 1608 and a modem 1600 which is configured to output data traffic for transmission through the steerable antenna 1606 via the upconverter 1602 and the amplifier circuit 1604. The steerable antenna 1606 is configured to produce an ESD pattern with a main lobe having a primary axis that is steerable toward a target satellite and a sequence of side lobes increasingly angularly offset from the primary axis.

The processing circuit 1608 may be configured to obtain data 1610 that includes aircraft altitude, attitude and location coordinates, satellite and beam data, antenna transmission measurements, full hemispherical antenna pattern data, GSO envelope data, and global map data. The processing circuit 1608 may be configured to obtain other data 1612 that includes NGSO data, terrestrial envelope data, and region (e.g., country or other regulatory entity) specific regulatory rules defining the regulatory PFD envelopes for associated regions on the ground, and information defining the full hemispherical antenna pattern. In accordance with the operations described herein, e.g., regarding FIG. 6, the processing circuit 1608 is configured to control via control line 1614 at least one of: 1) output power of the modem 1600 based on the target ESD pattern; and 2) bandwidth of the data traffic output by the modem 1600 based on the target ESD pattern.

The processing circuit 1608 includes at least one processor (processor for brevity), at least one memory (memory for brevity) storing program instructions. The processor may include one or more data processing circuits, such as a general purpose and/or special purpose processor (e.g., microprocessor and/or digital signal processor) that may be collocated or distributed across one or more networks. The processor is configured to execute computer program instructions in the memory, described below as a non-transitory computer readable medium, to perform at least some of the operations described herein as being performed by a A-ESIM terminal or other broad-based mitigation system. The computer program instructions when executed by the processor causes the processor to perform operations in accordance with one or more embodiments disclosed herein.

Figure 6:
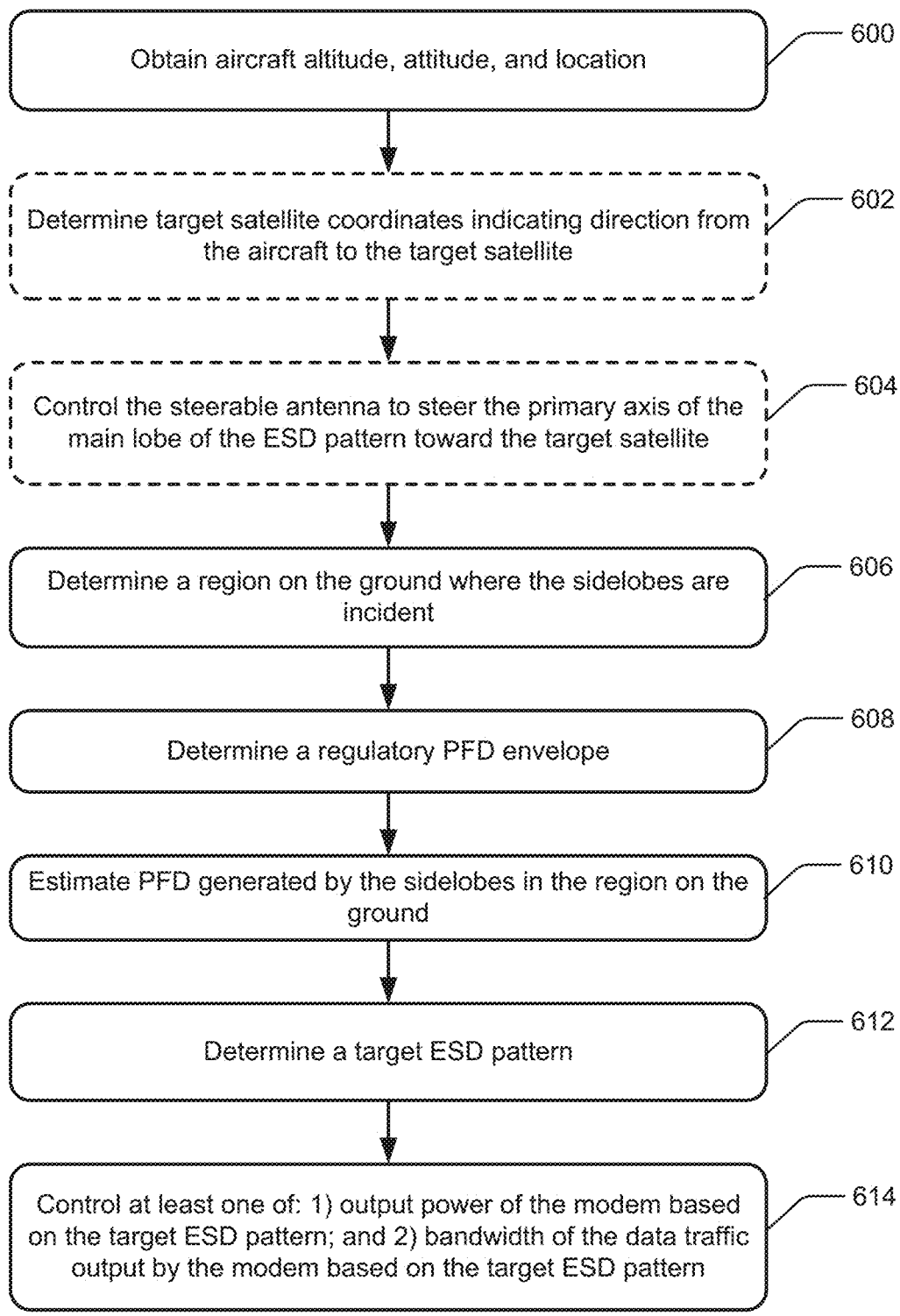
FIG. 6 is a flowchart of operations that are performed by processing circuitry of a broadband communication system in accordance with some embodiments of the present disclosure.

FIG. 6 is a flowchart of operations that are performed by processing circuitry of a broadband communication system in accordance with some embodiments of the present disclosure.

Referring to FIG. 6, the operations include obtaining 600 aircraft altitude, attitude, and location. The aircraft altitude, attitude, and location may be obtained from an aircraft avionics data network on the aircraft, such as the Aeronautical Radio, Incorporated (ARINC) 429 standard network. The operations determine 602 target satellite coordinates indicating direction from the aircraft to the target satellite, based on the aircraft altitude, attitude, and location. The operations control 604 the steerable antenna to steer the primary axis of the main lobe of the ESD pattern toward the target satellite, based on the target satellite coordinates. The operations determine 606 a region on the ground where the sidelobes are incident, based on the radiated signal power pattern of the steerable antenna and the aircraft altitude, attitude, and location. The operations further determine 608 a regulatory PFD envelope based on the region on the ground. The operations estimate 610 PFD generated by the sidelobes in the region on the ground based on the ESD pattern of the steerable antenna and the aircraft altitude, attitude, and location. The operations determine 612, based on the estimate of the PFD generated by the sidelobes in the region on the ground and based on the regulatory PFD envelope, a target ESD pattern for the steerable antenna. The operations control 614 at least one of: 1) output power of the modem based on the target ESD pattern; and 2) bandwidth of the data traffic output by the modem based on the target ESD pattern.

The operations to determine 602 satellite coordinates and to control 604 the steerable antenna are optional as being performed by the processing circuitry and, therefore, are illustrated with dashed lines. The operations 602 and 604 may be performed by other components that are external to the broadband communication system.

The operations can use geographic awareness to select which, if any, regulatory PFD envelope is relevant for use in constraining the PFD that is generated by the sidelobes on the ground.

In a given location while an aircraft is cruising, the operations may perform a 360 scan for the line of sight and identify countries or international water using an onboard map. In an example, shown in FIG. 7, an aircraft flying over the United States has a line of sight for where the sidelobes are incident which reaches both the United States and Canada, depicted by the conical shape of a scan. In this case, if either country has adopted a regulatory PFD envelope (e.g., ITU limit) for the PFD, the operations can determine 612 the target ESD pattern to comply with the envelope. If neither country has adopted such a regulatory PFD envelope, then no target ESD pattern needs to be determined and the transmission operations and process can be performed without being constrained by any need to comply with a PDF envelope.

Figure 7:
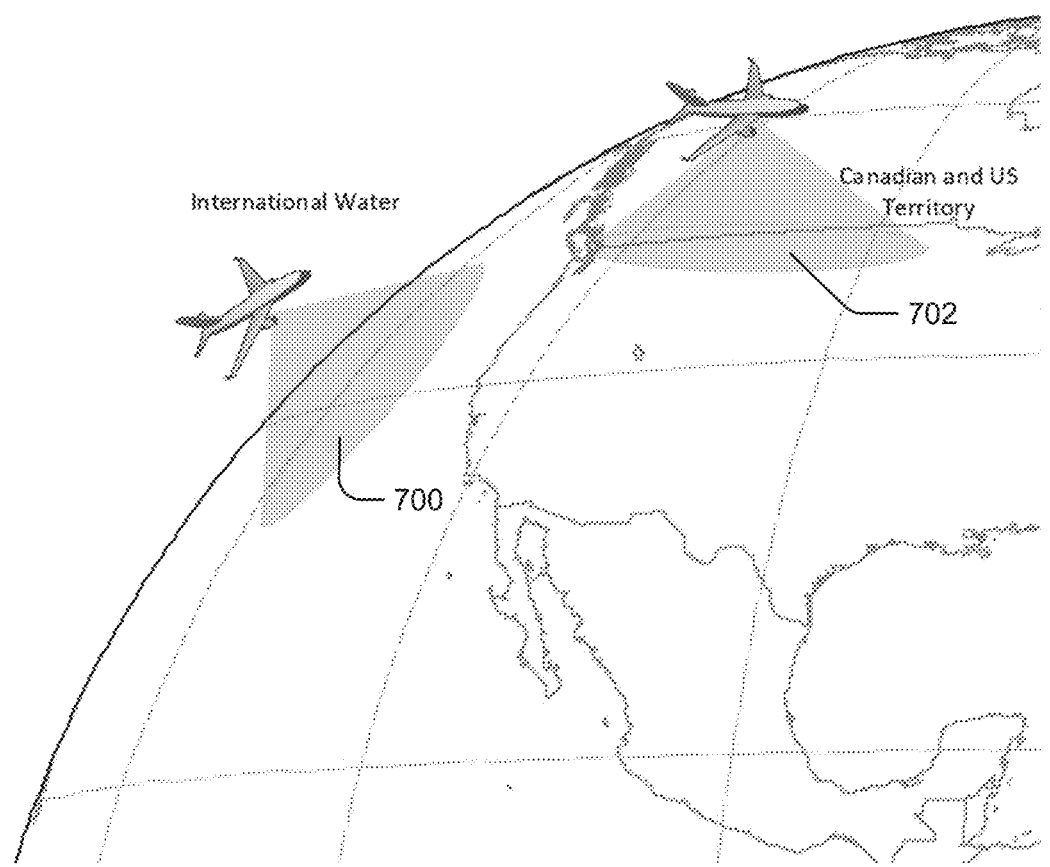
FIG. 7 illustrates operations to perform a 360° scan for the line of sight and identify countries or international water using an onboard map in accordance with some embodiments of the present disclosure.

FIG. 7 also illustrates another aircraft that is cruising over international water. The operations determine from a 360° scan that the line of sight of the sidelobes is incident in a region on the ground (water) that is outside any country. In this case, the operations of the A-ESIM terminal are immune from requiring compliance with any regulatory PFD envelope, such as one defined by ITU. The operations can stop and the remaining logic to determine 612 a target ESD pattern and control 614 power output of the modem and/or bandwidth of the data traffic are not necessary.

In some embodiments, the operation to determine 608 the regulatory PFD envelope includes retrieving the regulatory PFD envelope from a PFD envelope repository that associates regulatory regions to regulatory PFD envelopes, using the region on the ground where the sidelobes are incident. For example, a geographic map database that is transported by aircraft can be modified to add geographic region-based PFD envelopes which may be defined to vary with aircraft altitude. The operations can then identify which, if any, of the geographic region-based PFD envelopes are relevant for constraining antenna ESD based on the region on the ground the sidelobes are incident and based on the altitude of aircraft.

When the region on the ground where the sidelobes are incident overlaps two or more regulatory regions having different regulatory PFD envelopes, then the operations can choose to use the most restrictive regulatory PFD envelope. The operations to determine 608 the regulatory PFD envelope may include identifying any of the regulatory regions that are partially overlapped by the region on the ground where the sidelobes are incident. When a plurality of the regulatory regions are partially overlapped by the region on the ground where the sidelobes are incident, the operations determine a corresponding set of the regulatory PFD envelopes which are defined in the PFD envelope repository as being associated with the plurality of the regulatory regions. When the set of the regulatory PFD envelopes includes a plurality of different PFD envelopes, the operations identify a most restrictive one of the regulatory PFD envelopes in the set.

In one embodiment, the operations control 614 the output power of the modem based on the target ESD pattern. More particularly, the operations can include adjusting the output power of the modem based on the target ESD pattern to change a level of the PFD generated by the sidelobes in the region on the ground to approach the regulatory PFD envelope without exceeding the regulatory PFD envelope. When the PFD generated by the sidelobes in the region on the ground exceeds the regulatory PFD envelope, the operations can reduce the output power of the modem. In contrast, when the PFD generated by the sidelobes in the region on the ground is less than the regulatory PFD envelope, the operations can increase the output power of the modem. In this manner, the output power of the modem can be dynamically adjusted to provide a more optimized power level that improves communication efficiency without violating any regulatory PFD envelope defined for the incident region on the ground.

In an alternate embodiment, the operations control 614 the bandwidth of the data traffic output by the modem based on the target ESD pattern. More particularly, the operations can include adjusting bandwidth of the data traffic output by the modem based on the target ESD pattern to change a level of the PFD generated by the sidelobes in the region on the ground to approach the regulatory PFD envelope without exceeding the regulatory PFD envelope. When the PFD generated by the sidelobes in the region on the ground exceeds the regulatory PFD envelope, the operations can increase the bandwidth of the data traffic output by the modem. In contrast, when the PFD generated by the sidelobes in the region on the ground is less than the regulatory PFD envelope, the operations can reduce the bandwidth of the data traffic output by the modem. In this manner, the bandwidth of the data traffic output by the modem can be dynamically adjusted to provide a maximum data rate with the minimum bandwidth associated with communication efficiency without violating any regulatory PFD envelope defined for the incident region on the ground.

An operational algorithm performed by the processing circuit in real-time determines the most efficient combination of output power or bandwidth to control the ESD pattern to be at or below the PFD envelope at all times, in accordance with some embodiments. The operational algorithm can be configured to deliver substantially the same data rate with the lowest bandwidth and highest power while not exceeding the regulatory envelope. This leads to the highest spectral efficiency (bits/Hz) and reduces the cost of delivering bits ($/bits). In some other/further embodiments, the highest bit rate is delivered by the operational algorithm optimizing the power and the bandwidth proportionally. Although this may not be spectrally efficient it can ensure the highest bit rate delivered by the aeronautical broadband system.

Figure 8:
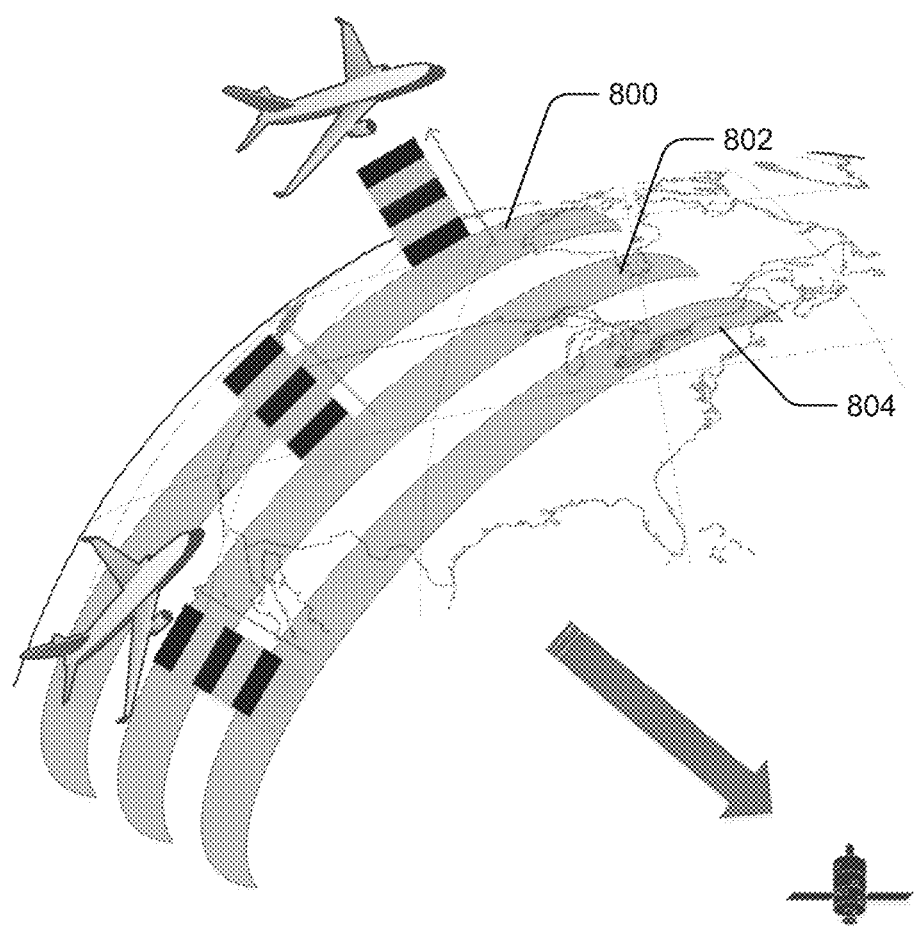
FIG. 8 illustrates how a desired operating region may be fragmented into combinations of elevation contours and altitude bands in accordance with some embodiments of the present disclosure.

In some embodiments, the operation to estimate 610 the PFD generated by the sidelobes in a region on the ground can be performed using a satellite coverage area that is virtually fragmented into contours of elevation angles. FIG. 8 illustrates how a desired operating region may be fragmented into combinations of elevation contours 800-804 and altitude bands. Effectively, every location of an aircraft is associated with the two-dimensional variables of elevation and altitude band (e.g., ranges of altitudes). The finer the elevation and altitude resolution, the more accurate the PFD estimation.

The operations to estimate 610 the PFD generated by the sidelobes on the ground can include estimating attenuation due to configuration of fuselage relative to the antenna, due to free space attention, polarization mismatch, and due to atmospheric attenuation (e.g., which may have a time-constant component based on frequency and distance).

Figure 9:
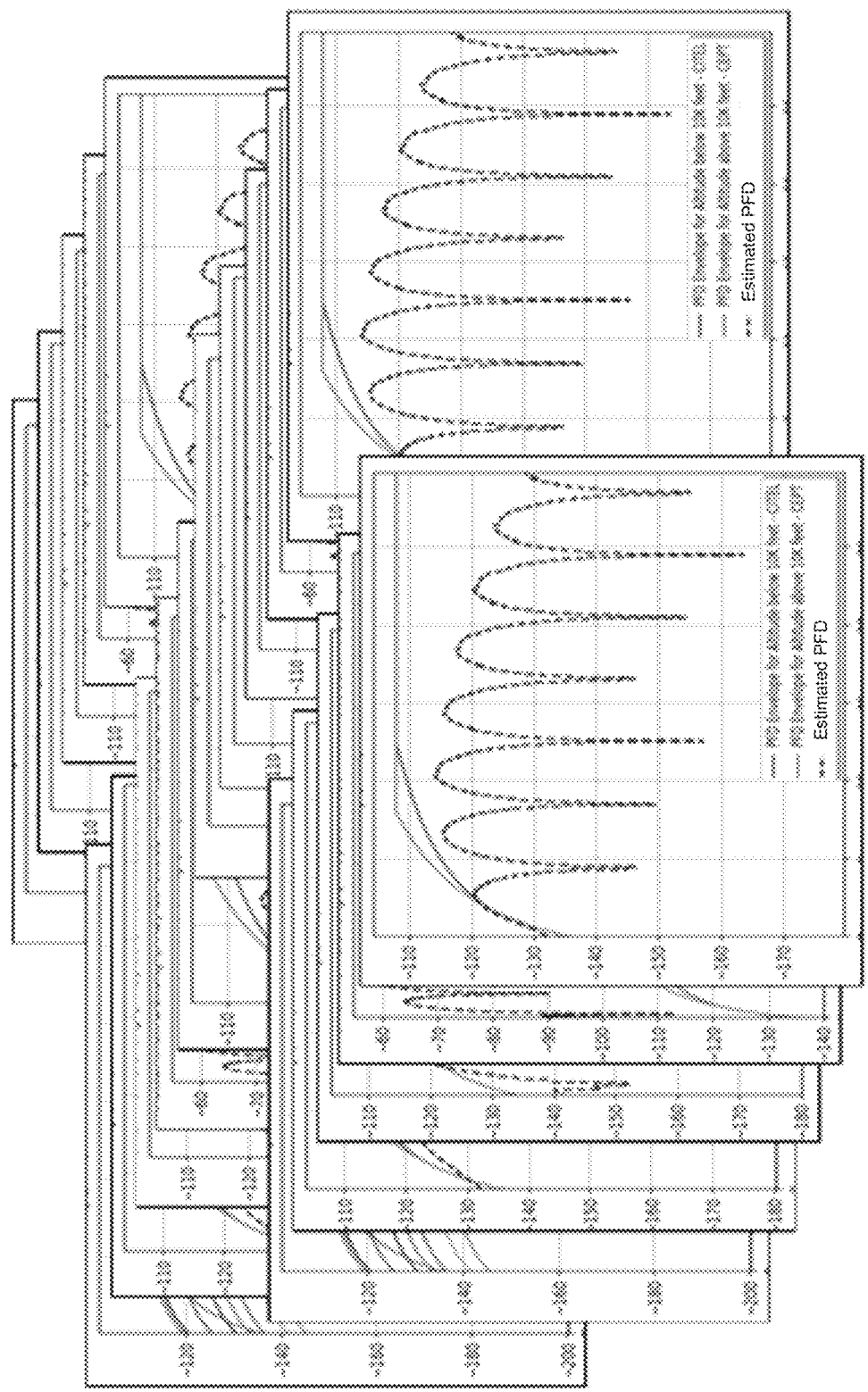
FIG. 9 illustrates graphs that can correspond to data structures that define for a plurality of different altitudes and elevations how an amount that the PFD generated by the sidelobes in the region on the ground is estimated to vary as a function of an incident angle of arrival of the sidelobes, and further illustrate the regulatory PFD aircraft altitude for above and below 10,000 feet, in accordance with some embodiments of the present disclosure.

In some embodiments, a data structure repository is provided that defines for a combination of altitude and elevation a reference PFD generated by the sidelobes in the region on the ground is estimated to vary as a function of an incident angle of arrival of the sidelobes. FIG. 9 illustrates graphs that can correspond to data structures that define for a plurality of different altitudes and elevations how an amount that the PFD generated by the sidelobes in the region on the ground is estimated to vary as a function of an incident angle of arrival of the sidelobes, and further illustrates graphs of the regulatory PFD aircraft altitude above 10,000 feet and for below 10,000 feet. Accordingly, in some embodiments each of the data structures further defines for the combination of altitude and elevation at least two profiles of the regulatory PFD envelope with each of the profiles corresponding to different ranges of aircraft altitudes. Example graphs from among the repository of FIG. 9 are illustrated and explained with reference to FIGS. 10-12. The estimate of PFD in FIGS. 9-12 may, in some embodiments, be computed for an ESD which hasn't been reduced by updating either the output power of the modem or the bandwidth of the data traffic (e.g., 0 dB ESD back off).

The operation to determine 608 the regulatory PFD envelope based on the region on the ground and to estimate 610 the PFD generated by the sidelobes in the region on the ground, can be performed based on selecting one of a plurality of data structures stored in the data structure repository based on the altitude and elevation of the aircraft. As explained above, each of the data structures can define for a combination of altitude and elevation an estimated PFD indicating an amount that PFD generated by the sidelobes in the region on the ground is estimated to vary as a function of an incident angle of arrival of the sidelobes, and can further define for the combination of altitude and elevation the regulatory PFD envelope indicating an amount that the regulatory PFD varies as a function of the incident angle of arrival of the sidelobes.

In one embodiment, the operation to determine 612, based on the estimate of the PFD generated by the sidelobes in the region on the ground and based on the regulatory PFD envelope, a target ESD pattern for the steerable antenna includes comparing the estimated PFD to the regulatory PFD envelope for the selected one of the data structures in the data structure repository. When the estimated PFD is less than the regulatory PFD envelope by at least a threshold amount, the operations 612 increase the target ESD pattern for the steerable antenna. In contrast, when at least a portion of the estimated PFD envelope is greater than the regulatory PFD envelope, the operations 612 decrease the target ESD pattern for the steerable antenna.

In a corresponding manner, the operation to control 614 at least one of: 1) output power of the modem based on the target ESD pattern; and 2) bandwidth of the data traffic output by the modem based on the target ESD pattern, can include the operations responding to when the ESD pattern exceeds the target ESD pattern, by decreasing the output power of the modem. In contrast, when the ESD pattern is less than the target ESD pattern, the operations can increase the output power of the modem. In this manner, the output power of the modem can be dynamically adjusted to provide a more optimized power level that improves communication efficiency without violating any regulatory PFD envelope defined for the incident region on the ground.

Alternatively or additionally, the operation to control 614 at least one of: 1) output power of the modem based on the target ESD pattern; and 2) bandwidth of the data traffic output by the modem based on the target ESD pattern, can include the operations responding to when the ESD pattern exceeds the target ESD pattern, by increasing the bandwidth of the data traffic output by the modem. In contrast, when the ESD pattern is less than the target ESD pattern, the operations can decrease the bandwidth of the data traffic output by the modem. In this manner, the bandwidth of the data traffic output by the modem can be dynamically adjusted to provide a maximum data rate with the minimum bandwidth associated with communication efficiency without violating any regulatory PFD envelope defined for the incident region on the ground.

Referring to FIG. 10, a regulatory PFD envelope 1010 is defined for aircraft altitude above 10,000 feet pursuant to CEPT. Another revelatory PFD envelope 1000 is defined for aircraft altitude below 10,000 feet pursuant to CITEL. An estimate of the PFD generated by the sidelobes in a region on the ground as function of the incident angle of arrival of the sidelobes to the ground, is visually illustrated by graph 1020. In the illustrated example, the estimated PFD 1020 generated by the sidelobes exceeds both regulatory PFD envelopes 1000 and 1010 in a small region on the ground where the incident angle of arrival of the sidelobes is between about for 0 to 2 degrees. If the region on the ground where the sidelobes is incident between about 0 to 2 degrees in within a regulatory region that has adopted the regulatory PFD envelopes, then the operations would slightly reduce the target ESD pattern so as to trigger a slight reduction in the output power of the modem and/or a slight increase in the bandwidth of the data traffic output by the modem.

FIG. 11 shows another example where the estimate 1130 of the PFD generated by the sidelobes more substantially exceeds the regulatory PFD envelopes 1110 (below 10,000 feet altitude pursuant to CITEL) and 1120 (above 10,000 feet altitude pursuant to CEPT) in a substantially greater region on the ground where the incident angle of arrival of the sidelobes is between about for 0 to 12 degrees. If the region on the ground where the sidelobes is incident between about 0 to 12 degrees in within a regulatory region that has adopted the regulatory PFD envelopes, then the operations would more greatly reduce (compared to FIG. 10) the target ESD pattern so as to trigger a greater reduction in the output power of the modem and/or a greater increase in the bandwidth of the data traffic output by the modem relative to FIG. 10.

FIG. 12 shows another example where the estimate 1230 of the PFD generated by the sidelobes does not exceed the regulatory PFD envelopes 1210 (below 10,000 feet altitude pursuant to CITEL) and 1220 (above 10,000 feet altitude pursuant to CEPT) in any of the region on the ground where the incident angle of arrival of the sidelobes is between about for 0 to 30 degrees. If the region on the ground where the sidelobes is incident between about 0 to 12 degrees in within a regulatory region that has adopted the regulatory PFD envelopes (CITEL and CEPT), then the operations can increase the transmitted ESD of the antenna by increasing the target ESD pattern to so as to trigger increase of the output power of the modem and/or decrease in the bandwidth of the data traffic output by the modem so that the estimated PFD generated by the sidelobes in the region on the ground approaches without exceeding the regulatory PDF envelope 1210 below 10,000 feet or, alternatively, approaches without exceeding the regulatory PDF envelope 1220 if the aircraft is above 10,000 feet.

Figure 13:
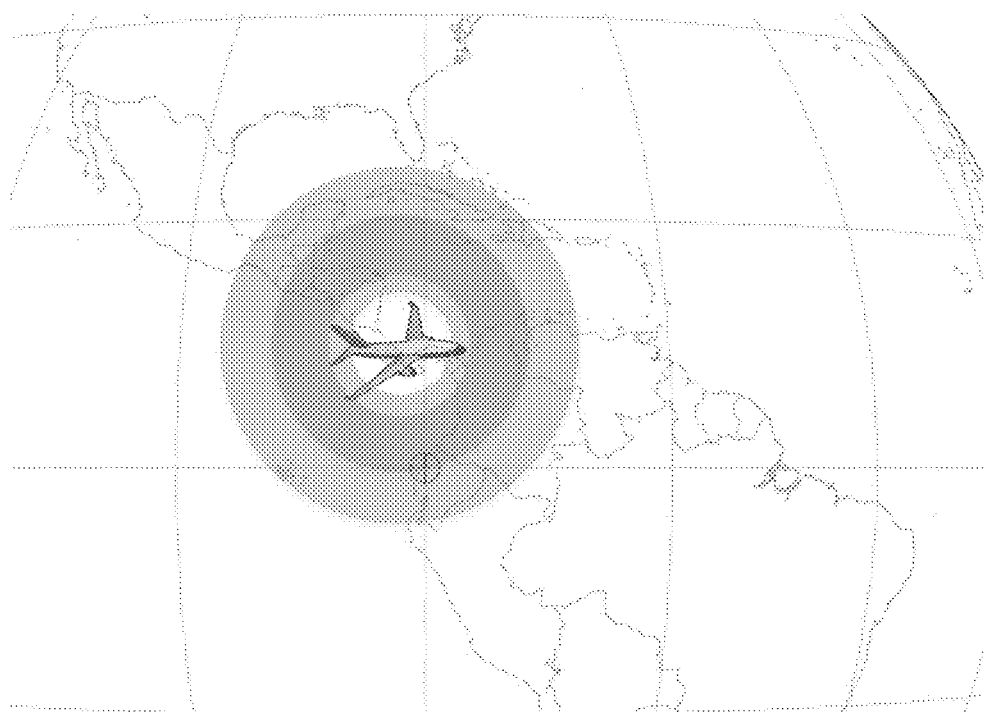
FIG. 13 illustrates concentric regions on the ground which have been operationally scanned to identify any mandated regulatory PDF envelopes and to estimate the angle of arrival of the sidelobes generated by the A-ESIM within those respective regions, in accordance with some embodiments.

It may become a standard practice for countries to have different adopted regulatory PFD envelopes for PFD generated by sidebands of a A-ESIM terminals intercepting the ground, to reserve certain frequency bands for non-use by an A-ESIM terminal, or to not mandate a regulatory generated by sidebands of A-ESIM terminals intercepting the ground. To address a scenario where countries may have different regulatory PFD envelopes, the operations may functionally create concentric conical regions on the ground to identify and isolate regulatory PDF envelopes adopted by specific countries. FIG. 13 illustrates concentric regions on the ground, which have been operationally scanned to identify any mandated regulatory PDF envelopes and to estimate the angle of arrival of the sidelobes generated by the A-ESIM terminal within those respective regions. The number of concentric conical regions depends on the unique set of PFD envelopes that a group of countries may have mandated. This ability allows having different PFD envelope over a country or group of countries. An A-ESIM terminal can operate to be aware of all countries within the line of sight. In FIG. 13, an A-ESIM terminal over Central America can separate into multiple groups of countries separated by the multiple concentric conical.

FIG. 14 illustrates an example ordered sequence of the operations explained above regarding FIGS. 6, 7, 8, 9, 10, 11, 12, and 13 to control the output power of the modem and/or the bandwidth of data traffic output by the modem so that the PFD generated by the sidelobes in a region on the ground is not exceed a regulatory PFD envelope that has been adopted by a country for that region. The ordered sequence of operations shown in FIG. 14 is provided as a non-limiting example according to some embodiments. The operations may be performed in other ordered sequences in accordance with various other embodiments of the present disclosure.

FIG. 15 illustrates another view of operations that may be performed by the processing circuit 1608 in FIG. 16 in accordance with some embodiments. The operations obtain 1502 aircraft altitude, attitude, and location coordinates, such as from an ARINC 429 aircraft data network 1500. The operations may control 1506 the antenna to steer the main lobe towards a target satellite, based on obtaining 1504 satellite and beam data such as from a database and control loop feedback. Operations can determine and control 1514 the effect of isotropic radiated power (EIRP) spectral density (ESD) based on obtaining 1508 characteristics of the antenna transmission, obtaining 1510 the GSO, and/or obtaining 1512 the NGSO envelope. The operations can determine and control the PFD based on obtaining 1516 the terrestrial envelope. The operations may optimize the output power of the modem and/or the bandwidth of data traffic output by the modem based on obtaining 1522 the country specific PFD envelope and determining 1520 region on the ground where the sidelobes are incident based on a global map 1520. The operations can control 1526 PFD generated by the sidelobes from antenna return transmissions, where the return transmissions refer to transmissions from the antenna on the aircraft toward one or more satellites for relay to a ground station. Three regulatory envelopes—ESD for both GSO and NGSO, and PSD for terrestrial must be complied at all time. The processing circuit determines a single, the most efficient ESD to comply with all three envelopes.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A broadband communication system aboard an aircraft, the broadband communication system comprising:
    a steerable antenna configured to produce an effective isotropic radiated power (EIRP) spectral density (ESD) pattern with a main lobe having a primary axis that is steerable toward a target satellite and a sequence of side lobes increasingly angularly offset from the primary axis;
    a modem configured to output data traffic for transmission through the steerable antenna; and
    processing circuitry configured to:
        obtain aircraft altitude, attitude, and location;
        determine target satellite coordinates indicating direction from the aircraft to the target satellite, based on the aircraft altitude, attitude, and location;
        control the steerable antenna to steer the primary axis of the main lobe of the ESD pattern toward the target satellite, based on the target satellite coordinates;
        determine a region on the ground where the sidelobes are incident, based on the radiated signal power pattern of the steerable antenna and the aircraft altitude, attitude, and location;
        determine a regulatory power flux density (PFD) envelope based on the region on the ground;
        estimate PFD generated by the sidelobes in the region on the ground based on the ESD pattern of the steerable antenna and the aircraft altitude, attitude, and location;
        determine, based on the estimate of the PFD generated by the sidelobes in the region on the ground and based on the regulatory PFD envelope, a target ESD pattern for the steerable antenna; and
        control at least one of: 1) output power of the modem based on the target ESD pattern; and 2) bandwidth of the data traffic output by the modem based on the target ESD pattern.

2. A broadband communication system for an aircraft including a steerable antenna configured to produce an effective isotropic radiated power (EIRP) spectral density (ESD) pattern with a main lobe having a primary axis that is steerable toward a target satellite and a sequence of side lobes increasingly angularly offset from the primary axis, and further including a modem configured to output data traffic for transmission through the steerable antenna, the broadband communication system comprising:
    processing circuitry configured to operate to:
        obtain aircraft altitude, attitude, and location;
        determine a region on the ground where the sidelobes are incident, based on the radiated signal power pattern of the steerable antenna and the aircraft altitude, attitude, and location;
        determine a regulatory power flux density (PFD) envelope based on the region on the ground;
        estimate PFD generated by the sidelobes in the region on the ground based on the ESD pattern of the steerable antenna and the aircraft altitude, attitude, and location;
        determine, based on the estimate of the PFD generated by the sidelobes in the region on the ground and based on the regulatory PFD envelope, a target ESD pattern for the steerable antenna; and
        control at least one of: 1) output power of the modem based on the target ESD pattern; and 2) bandwidth of the data traffic output by the modem based on the target ESD pattern.

3. The broadband communication system of claim 2, wherein the processing circuitry is further configured to determine the regulatory PFD envelope based on:
    retrieving the regulatory PFD envelope from a PFD envelope repository that associates regulatory regions to regulatory PFD envelopes, using the region on the ground where the sidelobes are incident.

4. The broadband communication system of claim 3, wherein the processing circuitry is further configured to determine the regulatory PFD envelope based on:
    identifying any of the regulatory regions that are partially overlapped by the region on the ground where the sidelobes are incident;
    when a plurality of the regulatory regions are partially overlapped by the region on the ground where the sidelobes are incident, determining a corresponding set of the regulatory PFD envelopes which are defined in the PFD envelope repository as being associated with the plurality of the regulatory regions; and
    when the set of the regulatory PFD envelopes includes a plurality of different PFD envelopes, identifying a most restrictive one of the regulatory PFD envelopes in the set.

5. The broadband communication system of claim 2, wherein the processing circuitry is further configured to perform operations to control at least one of: 1) output power of the modem based on the target ESD pattern; and 2) bandwidth of the data traffic output by the modem based on the target ESD pattern, based on:

adjusting the output power of the modem based on the target ESD pattern to change a level of the PFD generated by the sidelobes in the region on the ground to approach the regulatory PFD envelope without exceeding the regulatory PFD envelope.

6. The broadband communication system of claim 2, wherein the processing circuitry is further configured to perform operations to control at least one of: 1) output power of the modem based on the target ESD pattern; and 2) bandwidth of the data traffic output by the modem based on the target ESD pattern, based on:

adjusting bandwidth of the data traffic output by the modem based on the target ESD pattern to change a level of the PFD generated by the sidelobes in the region on the ground to approach the regulatory PFD envelope without exceeding the regulatory PFD envelope.

7. The broadband communication system of claim 2, wherein the processing circuitry is further configured to perform operations to determine the regulatory power flux density (PFD) envelope based on the region on the ground and to estimate the PFD generated by the sidelobes in the region on the ground, based on:

selecting one of a plurality of data structures stored in a data structure repository based on the altitude and elevation of the aircraft, wherein each of the data structures defines for a combination of altitude and elevation an estimated PFD indicating an amount that PFD generated by the sidelobes in the region on the ground is estimated to vary as a function of an incident angle of arrival of the sidelobes, and further defines for the combination of altitude and elevation the regulatory PFD envelope indicating an amount that the regulatory PFD varies as a function of the incident angle of arrival of the sidelobes.

8. The broadband communication system of claim 7, wherein the processing circuitry is further configured to perform operations to determine, based on the estimate of the PFD generated by the sidelobes in the region on the ground and based on the regulatory PFD envelope, a target ESD pattern for the steerable antenna, based on:

comparing the estimated PFD to the regulatory PFD envelope for the selected one of the data structures in the data structure repository;

when the estimated PFD is less than the regulatory PFD envelope by at least a threshold amount, increase the target ESD pattern for the steerable antenna; and when at least a portion of the estimated PFD is greater than the regulatory PFD envelope, decrease the target ESD pattern for the steerable antenna.

9. The broadband communication system of claim 8, wherein the processing circuitry is further configured to control at least one of: 1) output power of the modem based on the target ESD pattern; and 2) bandwidth of the data traffic output by the modem based on the target ESD pattern, based on:

when the ESD pattern exceeds the target ESD pattern, decrease the output power of the modem; and when the ESD pattern is less than the target ESD pattern, increase the output power of the modem.

10. The broadband communication system of claim 8, wherein the processing circuitry is further configured to control at least one of: 1) output power of the modem based on the target ESD pattern; and 2) bandwidth of the data traffic output by the modem based on the target ESD pattern, based on:

when the ESD pattern exceeds the target ESD pattern, increase the bandwidth of the data traffic output by the modem; and when the ESD pattern is less than the target ESD pattern, decrease the bandwidth of the data traffic output by the modem.

11. The broadband communication system of claim 7, wherein each of the data structures further define for the combination of altitude and elevation at least two profiles of the regulatory PFD envelope with each of the profiles corresponding to different ranges of aircraft altitudes.

12. A computer program product comprising:

a non-transitory computer readable medium storing program instructions that is executable by at least one processor of a processing circuit of a broadband communication system aboard an aircraft, the aircraft includes a steerable antenna configured to produce an effective isotropic radiated power (EIRP) spectral density (ESD) pattern with a main lobe having a primary axis that is steerable toward a target satellite and a sequence of side lobes increasingly angularly offset from the primary axis, and further including a modem configured to output data traffic for transmission through the steerable antenna, the program instructions executed by the at least one processor causes the at least one processor to perform operations comprising:

obtaining aircraft altitude, attitude, and location;

determining a region on the ground where the sidelobes are incident, based on the radiated signal power pattern of the steerable antenna and the aircraft altitude, attitude, and location;

determining a regulatory power flux density (PFD) envelope based on the region on the ground;

estimating PFD generated by the sidelobes in the region on the ground based on the ESD pattern of the steerable antenna and the aircraft altitude, attitude, and location;

determining, based on the estimate of the PFD generated by the sidelobes in the region on the ground and based on the regulatory PFD envelope, a target ESD pattern for the steerable antenna; and controlling at least one of: 1) output power of the modem based on the target ESD pattern; and 2) bandwidth of the data traffic output by the modem based on the target ESD pattern.

13. The computer program product of claim 12, wherein program instructions executed by the at least one processor causes the at least one processor to determine the regulatory PFD envelope based on:

retrieving the regulatory PFD envelope from a PFD envelope repository that associates regulatory regions to regulatory PFD envelopes, using the region on the ground where the sidelobes are incident.

14. The computer program product of claim 13, wherein program instructions executed by the at least one processor causes the at least one processor to determine the regulatory PFD envelope based on:

identifying any of the regulatory regions that are partially overlapped by the region on the ground where the sidelobes are incident;

when a plurality of the regulatory regions are partially overlapped by the region on the ground where the sidelobes are incident, determining a corresponding set of the regulatory PFD envelopes which are defined in the PFD envelope repository as being associated with the plurality of the regulatory regions; and when the set of the regulatory PFD envelopes includes a plurality of different PFD envelopes, identifying a most restrictive one of the regulatory PFD envelopes in the set.

15. The computer program product of claim 12, wherein program instructions executed by the at least one processor causes the at least one processor to control at least one of: 1) output power of the modem based on the target ESD pattern; and 2) bandwidth of the data traffic output by the modem based on the target ESD pattern, based on:
adjusting the output power of the modem based on the target ESD pattern to change a level of the PFD generated by the sidelobes in the region on the ground to approach the regulatory PFD envelope without exceeding the regulatory PFD envelope.

16. The computer program product of claim 12, wherein program instructions executed by the at least one processor causes the at least one processor to control at least one of: 1) output power of the modem based on the target ESD pattern; and 2) bandwidth of the data traffic output by the modem based on the target ESD pattern, based on:
adjusting bandwidth of the data traffic output by the modem based on the target ESD pattern to change a level of the PFD generated by the sidelobes in the region on the ground to approach the regulatory PFD envelope without exceeding the regulatory PFD envelope.

17. The computer program product of claim 12, wherein program instructions executed by the at least one processor causes the at least one processor to perform operations to determine the regulatory power flux density (PFD) envelope based on the region on the ground and to estimate the PFD generated by the sidelobes in the region on the ground, based on:
selecting one of a plurality of data structures stored in a data structure repository based on the altitude and elevation of the aircraft, wherein each of the data structures defines for a combination of altitude and elevation an estimated PFD indicating an amount that PFD generated by the sidelobes in the region on the ground is estimated to vary as a function of an incident angle of arrival of the sidelobes, and further defines for the combination of altitude and elevation the regulatory PFD envelope indicating an amount that the regulatory PFD varies as a function of the incident angle of arrival of the sidelobes.

18. The computer program product of claim 17, wherein program instructions executed by the at least one processor causes the at least one processor to determine, based on the estimate of the PFD generated by the sidelobes in the region on the ground and based on the regulatory PFD envelope, a target ESD pattern for the steerable antenna, based on:
comparing the estimated PFD to the regulatory PFD envelope for the selected one of the data structures in the data structure repository;
when the estimated PFD is less than the regulatory PFD envelope by at least a threshold amount, increase the target ESD pattern for the steerable antenna; and
when at least a portion of the estimated PFD is greater than the regulatory PFD envelope, decrease the target ESD pattern for the steerable antenna.

19. The computer program product of claim 18, wherein program instructions executed by the at least one processor causes the at least one processor to control at least one of: 1) output power of the modem based on the target ESD pattern; and 2) bandwidth of the data traffic output by the modem based on the target ESD pattern, based on:
when the ESD pattern exceeds the target ESD pattern, decrease the output power of the modem; and
when the ESD pattern is less than the target ESD pattern, increase the output power of the modem.

20. The computer program product of claim 18, wherein program instructions executed by the at least one processor causes the at least one processor to control at least one of: 1) output power of the modem based on the target ESD pattern; and 2) bandwidth of the data traffic output by the modem based on the target ESD pattern, based on:
when the ESD pattern exceeds the target ESD pattern, increase the bandwidth of the data traffic output by the modem; and
when the ESD pattern is less than the target ESD pattern, decrease the bandwidth of the data traffic output by the modem.

21. The computer program product of claim 17, wherein each of the data structures further define for the combination of altitude and elevation at least two profiles of the regulatory PFD envelope with each of the profiles corresponding to different ranges of aircraft altitudes.

* * * * *